J. THOMPSON.
MINIATURE CANAL SYSTEM.
APPLICATION FILED OCT. 28, 1912.
1,181,554.
Patented May 2, 1916.
2 SHEETS—SHEET 2.
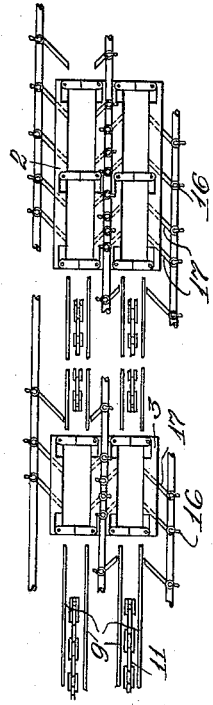
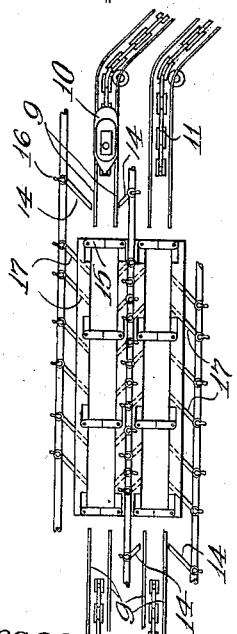
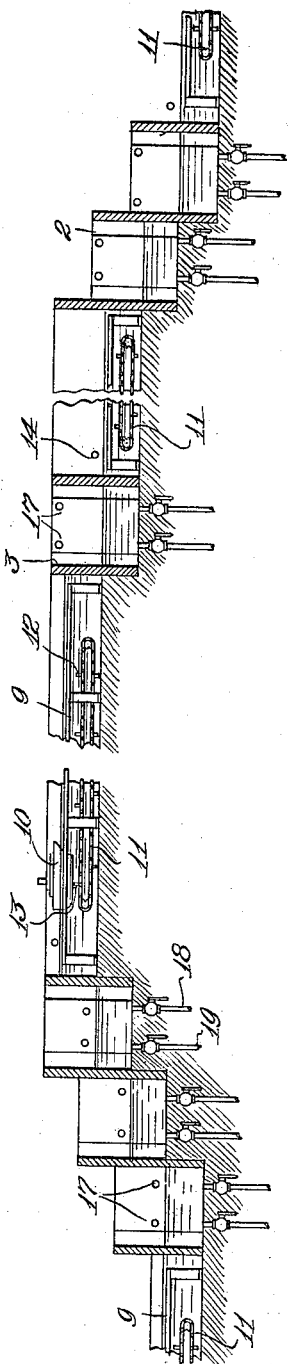
Witnesses:
Harry S. Gaither
Inventor:
John Thompson,
by Chamberlin Freudenreich
Att'ys.

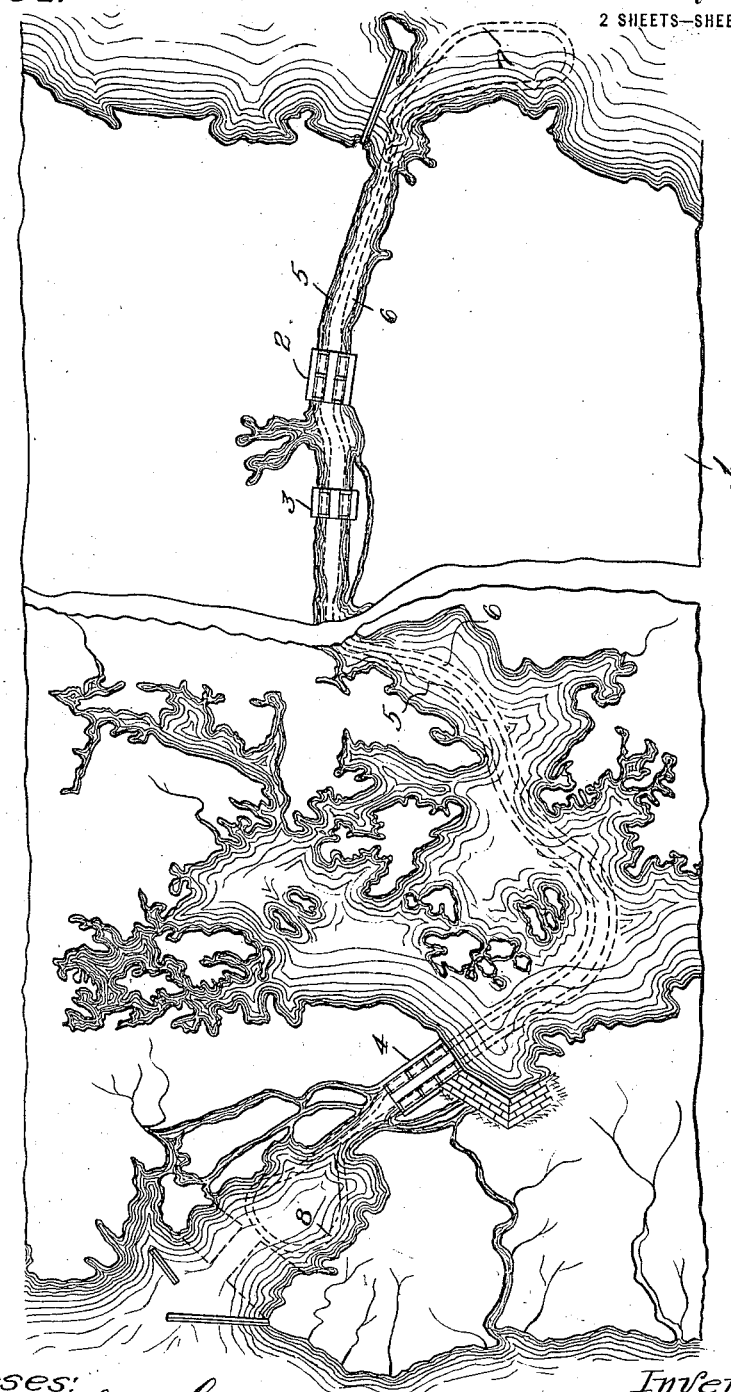

UNITED STATES PATENT OFFICE.

JOHN THOMPSON, OF ROCKLAND LAKE, NEW YORK, ASSIGNOR, BY MESNE ASSIGNMENTS, TO THE ANGLO-CALIFORNIA TRUST COMPANY, TRUSTEE, OF SAN FRANCISCO, CALIFORNIA, A CORPORATION OF CALIFORNIA.

MINIATURE CANAL SYSTEM.

1,181,554.  Specification of Letters Patent.  Patented May 2, 1916.

Application filed October 28, 1912. Serial No. 728,070.

*To all whom it may concern:*

Be it known that I, JOHN THOMPSON, a citizen of the United States, residing at Rockland Lake, Congers, county of Rockland, State of New York, have invented a certain new and useful Improvement in Miniature Canal Systems, and declare the following to be a full, clear, and exact description of the same, such as will enable others skilled in the art to which it pertains to make and use the same, reference being had to the accompanying drawings, which form a part of this specification.

My invention has for its object to produce a simple, attractive miniature canal system through which boats may be passed in a realistic manner and locked from one level to another.

Specifically considered, the object of my invention is to produce a miniature canal system which shall accurately represent the Panama Canal in form and through which boats may be carried in a simple and effective manner so as accurately to picture to an observer the passage of boats through the Panama Canal. In other words, the specific object of my invention is to produce an educational appliance which shall faithfully reproduce the Panama Canal system and its workings on a small scale.

The various features of novelty whereby my invention is characterized will hereinafter be pointed out with particularity in the claims; but for a full understanding of my invention and of its objects and advantages, reference may be had to the following detailed description taken in connection with the accompanying drawings, wherein:

Figure 1 is a plan view of the device, including the canal and the canal zone, the intermediate portion being broken away for the purpose of illustration; Fig. 2 is a plan view of the main portions of the canal, particularly those in the vicinity of the locks, illustrating the means for guiding and moving the boats; Fig. 3 is a longitudinal section through one of the channels, including the locks, as illustrated in Fig. 1; and Fig. 4 is a view of a fragment, corresponding to Fig. 2, and showing a modification.

Referring to the drawing, 1 represents a suitable structure having its upper surface shaped to represent in relief the Panama Canal Zone; 2, 3 and 4 representing the several locks or groups of locks. Starting on the Pacific side are two sets of locks, 2, representing the Miraflores locks, then comes the single lock, 3, representing the Pedro Miguel lock, and finally adjacent to the Atlantic end are the three sets of locks, 4, representing the Gatun locks. Suitable guides are provided, following the channel of the canal, to permit boats to be carried through the canal along the proper channel. I prefer to arrange two sets of guides, indicated at 5 and 6, approximately parallel with each other, one being adapted for boats going in one direction and the other for boats going in the opposite direction. At the ends of the canal the guides join each other so as to form loops, 7 and 8. Consequently the two sets of guides form in substance, a continuous endless guide which permits boats to run continuously back and forth through the canal, swinging around and returning into the canal in the bays or harbors at the ends thereof. The guides extend into and terminate in proximity to the locks, being interrupted by the locks.

The guides may of course take various forms, although I prefer to make each guide of two parallel rails, 9, supported so as to lie just below the surface of the water when the canal is full, and spaced apart just far enough to permit a boat, 10, to float freely between them. The boats may be actuated in various ways. In the arrangement shown in Figs. 2 and 3, endless chains, 11, are arranged beneath each of the guides, each chain extending from one lock to another, or to the ocean ends of the canal, following the loops of the guides. If desired, however, the chains or conveyers beneath each section of the guides may be made in several pieces. The chains are provided at intervals with outwardly-projecting pins, 12, the parts being so disposed that the pins on the upper half of each chain extend upwardly. On the under side of each boat is a cross bar or projection, 13, which extends down into the path of the pins on the chains. Consequently when the chains are in operation and a boat lies between the guides above any one chain, that chain will pick up the boat and carry it toward one of the locks. As the boat approaches the lock, it is released from the chain and remains in front of the lock until admitted thereto.

Various means may be provided for carrying the boats into and through the locks. In Figs. 1 and 2 I have illustrated a system of air nozzles so arranged that when a boat lies in front of a lock, the gates of the lock are opened, and air is allowed to flow through the proper nozzles, the boat is blown into the lock by air pressure. In the same way the boat may be blown out of the lock when the water in the lock has been brought to the level on the discharge side of the lock. The nozzles may of course be distributed in various ways and the air may be supplied in any suitable manner. In the arrangement shown, there is arranged in the front of each lock or group of locks a pair of nozzles, 14, which are pointed toward the inlet end of the lock and converge toward each other so that the two blasts or currents of air meet at about the longitudinal center of the lock. Consequently, when the gates, 15, of the lock are opened, a boat is lying in front of the lock ready to enter, the air is admitted from a suitable supply pipe, 16, through a valve connection to the nozzles, 14, the converging streams of air will blow the boat into the lock. After a boat enters the lock, the gates are closed and the water level in the lock is raised or lowered depending upon whether the boat is going up or down, and the boat may then be blown out of the lock into the next lock or into the canal by means of blasts or streams of air flowing through one or more sets of nozzles, 17, arranged in pairs at opposite sides of the lock and directed in the same way as the nozzles 14. The water level in the locks may be controlled in various ways as, for example, by means of valve pipes, 18 and 19, through one of which water may escape from a lock, to lower the level, and through the other of which water may be admitted into the lock to raise the level.

Instead of air blasts, I may use a series of electro-magnets, 20, as indicated in Fig. 4, suitable means being provided for alternately energizing and deënergizing the magnets at the proper time so as to attract the boats progressively at various stages in entering and leaving the locks. Furthermore, if desired, the magnets may also be used to move the boats along the canal proper, as a substitute for the chains.

While I have illustrated and described in a general way only two preferred forms of my invention, I do not desire to be limited to the details thus illustrated and described, but intend to cover all forms and arrangements which fall within the terms employed in the definitions of my invention, constituting the appended claims.

I claim:

1. In a miniature canal system having a lock, guides in the canal for guiding a boat along the same to a point in front of the lock, a movable chain in proximity to the guide, and means on the chain and on the boat for causing the chain to drive the boat to a point in front of the lock, and separate means for causing the boat to move into the lock.

2. In a miniature canal system, a boat, and air nozzles arranged on opposite sides of the channel so as to direct converging streams of air against the boat to move the same.

3. In a miniature canal system having a lock, means exterior to a boat for moving the boat along the canal toward the lock and for directing converging streams of fluid against the boat from opposite sides of the canal to drive the boat into the lock.

4. In a miniature canal system having a lock, guides in the canal for guiding a boat along the same to a point in front of the lock, means exterior to the boat in addition to the water in the canal for moving the boat along said guide into proximity to the lock, and separate means for causing the boat to move into the lock.

In testimony whereof, I sign this specification in the presence of two witnesses.

JOHN THOMPSON.

Witnesses:
HARRY KLING,
WM. HYLAND.

Copies of this patent may be obtained for five cents each, by addressing the "Commissioner of Patents. Washington, D. C."